Patented Mar. 28, 1950

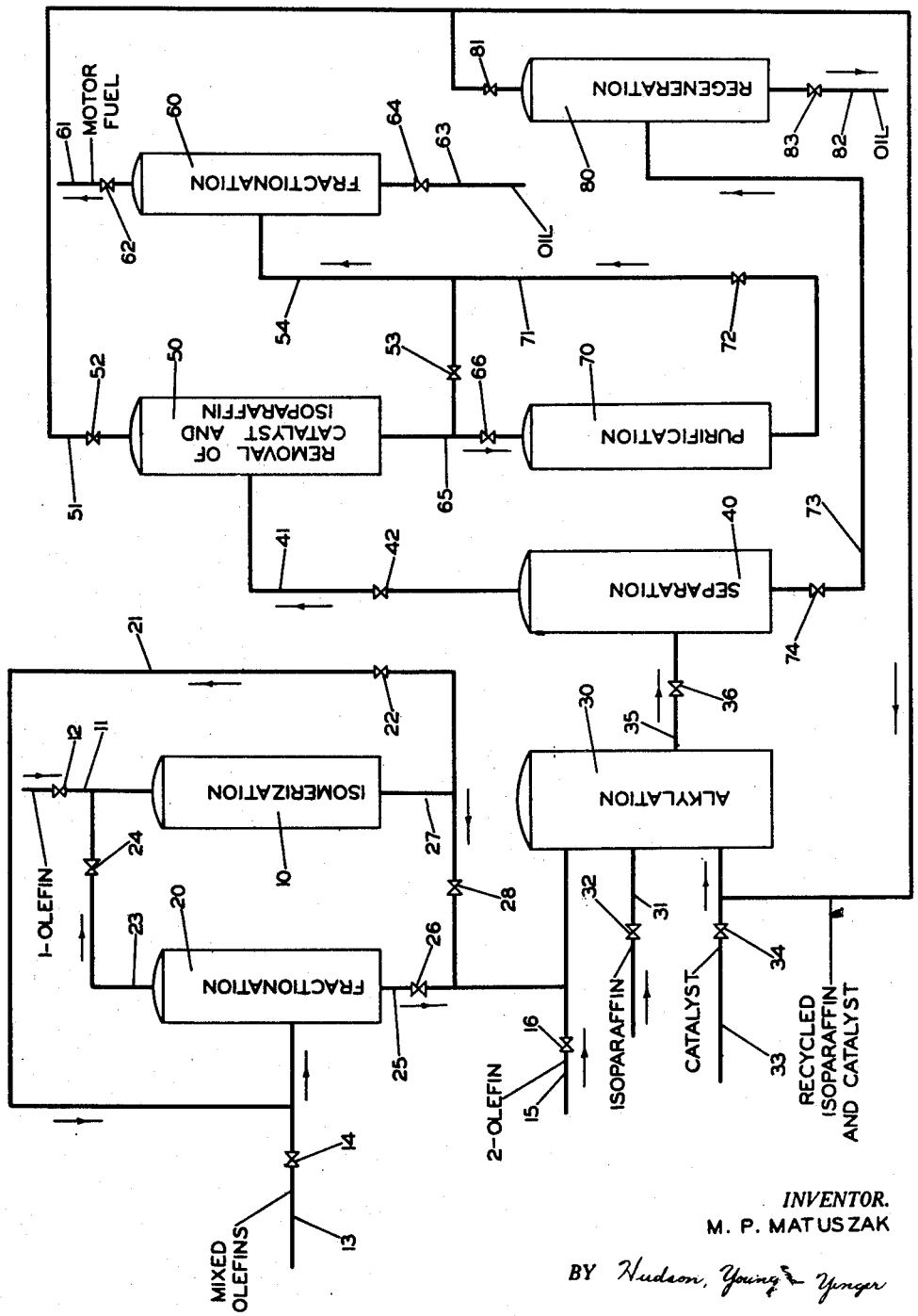

2,502,015

UNITED STATES PATENT OFFICE 2,502,015

METHOD OF ALKYLATING ISOPARAFFINS WITH 2-OLEFINS

Maryan P. Matuszak, Bartlesville, Okla., assignor to Phillips Petroleum Company, a corporation of Delaware Application December 4, 1942, Serial No. 467,873

3 Claims. (Cl. 260—683.4)

This invention relates to the production of motor fuels, and more particularly to a process in which 2-olefins are catalytically reacted with low-boiling isoparaffins to produce motor-fuel paraffins.

In my copending application Serial No. 441,705, filed May 4, 1942, now U. S. Patent No. 2,403,671, there is disclosed a process whereby olefins having at least four carbon atoms in an open chain are isomerized, one to another, by contact with an isomerization catalyst. One specific embodiment of the process of the present application involves isomerization of secondary 1-olefins to 2-olefins, wherein any suitable isomerization catalyst may be used, and utilization of the resulting 2-olefins for catalytic alkylation of low-boiling isoparaffins, whereby motor-fuel paraffins superior in quality to those obtainable by similar alkylation with the original 1-olefins are produced.

An object of this invention is to provide an improved process for the production of high octane paraffins suitable for use as motor fuel from low boiling secondary olefins and isoparaffins of four to five carbon atoms.

Another object of this invention is to provide such a process in which 1-olefins are converted to 2-olefins prior to alkylation of isoparaffins to produce high octane paraffins suitable for motor fuel.

A specific object of the invention is to produce superior motor-fuel paraffins from isobutane and secondary butenes.

Another specific object is to produce superior motor-fuel paraffins from isobutane and secondary pentenes.

Another specific object is to produce superior motor-fuel paraffins from isopentane and secondary butenes.

Other and similar objects and advantages of this invention will be apparent from the following description, the accompanying drawing and/or the appended claims. By secondary olefins is meant non-tertiary base olefins, for example, butene-1, butene-2, pentene-1, pentene-2, 3-methyl butene-1, etc.

One specific embodiment of the present invention comprises isomerization of at least one secondary 1-olefin having at least four carbon atoms in an open chain, such as butene-1, pentene-1, 3-methyl butene-1, or the like, into the corresponding 2-olefin, such as butene-2, pentene-2, 2-methyl butene-2, or the like, and catalytically alkylating a low-boiling isoparaffin, such as isobutane and/or isopentane, with the resulting 2-olefin, preferably in the presence of a catalyst comprising principally hydrogen fluoride, whereby are produced paraffins superior in quality for present-day motor-fuel purposes to those obtainable by alkylation of the isoparaffin with the original 1-olefin.

Understanding of some aspects of the invention may be facilitated by the accompanying drawing, which is a flow-diagram illustrating the relationship of various steps in a specific embodiment of the invention.

With reference to the drawing, the 1-olefin may enter isomerization means 10 through inlet 11 controlled by valve 12. In isomerization means 10, it is subjected to the isomerization action of an isomerization catalyst under isomerization conditions, whereby it is converted at least partly into the corresponding 2-olefin. The isomerization catalyst is preferably a solid granular material of the type of magnesia, alumina, bauxite, beryllia, chromia, and the like; it is further preferably a catalyst comprising black chromium oxide. These various materials are not complete equivalents of each other, so that the optimum isomerization conditions for any particular catalyst may differ from those for another particular catalyst, but in general a suitable combination of temperature and contact time may be readily found, as by trial, in the ranges of 100 to 800° F. and of a fraction of a second to many minutes. Above its critical temperature, the olefin is in the gaseous state; but below the critical temperature, it is preferably at least partly in the liquid state, as the liquid in contact with the catalyst has a desirable washing action on the catalyst.

In many instances, isomerization means 10 may advantageously comprise a fractional-distillation column packed with a granular isomerization catalyst and operated in a temperature range below the critical temperature of the olefin, whereby it is ensured that the effluent approaches the equilibrium composition for the temperature at the exit end of the catalyst bed. The 1-olefin is fed into the top of the column, and it becomes partly isomerized to the corresponding 2-olefin by contact with the isomerization-catalyst packing. The resulting mixture, which is partly in the liquid condition, flows downward through the catalyst packing and eventually reaches the end of the packing as a mixture of approximately the equilibrium composition for the temperature at that point. This mixture may be passed to fractionation means 20, as through conduit 21 controlled by valve 22, and may be separated therein into the two isomeric olefins by fractional distillation in the absence of an isomerization catalyst; the unconverted 1-olefin may then be returned to isomerization means 10, as through conduit 23 controlled by valve 24, and the 2-olefin may be passed to alkylation means 30, as through conduit 25 controlled by valve 26. Instead of being so separated in fractionation means 20, the mixture may be advantageously separated by incorporating in isomerizing means 10 a lower section that is packed with a non-isomerizing packing or that has other fractionating devices performing the function of fractionating plates, whereby the higher-boiling 2-olefin works its way downward and eventually passes from the column, going to alkylation means 30, as through conduit 27 controlled by valve 28, whereas the unconverted 1-olefin passes upwardly to the catalyst-packed upper section of the column.

If the original 1-olefin is in the form of a mixture with the isomeric 2-olefin, this mixture may be fed to isomerization means 10 through inlet 11, but it is preferably fed to fractionation means 20, as through inlet 13 controlled by valve 14, or to the corresponding point in isomerization means 10 if this is operated as has just been described.

If desired, the fractionation to separate the 2-olefin from unreacted 1-olefin may be omitted, and the mixture of isomeric olefins may be passed directly from the isomerization zone to alkylation means 30 through conduit 27 and valve 28. However, although this mode of operation is economical in that the equipment and labor involved in the fractionation is not used, it does not yield an alkylate of the highest quality obtainable by the fullest application of the principles of this invention.

In the foregoing detailed description of the apparatus, it has been assumed that the olefin feed stock available comprises the 1-olefin. In general, the secondary or normal butylenes or amylenes available as feed stocks from refinery operations are a mixture of the 1-olefin and the 2-olefin containing high percentages of the 1-olefin. These mixed olefins are advantageously supplied to the process through the pipe 13 as previously described. However, the 2-olefins may be available in either substantially pure form or may be predominant in a mixture of other hydrocarbons substantially inert or non-injurious to the alkylation reaction. These 2-olefins may be supplied to the system through the pipe 15 controlled by the valve 16. The 2-olefins supplied in this manner may make up any part or all of the olefin feed to the system. In the later instance the fractionator 20 and isomerizer 10 may be dispensed with.

In alkylation means 30, the 2-olefin is added to an intimate alkylation mixture comprising a molecular excess of an isoparaffin, such as isobutane and/or isopentane, which is introduced into the system through inlet 31 controlled by valve 32, and an alkylation catalyst, which is introduced into the system through inlet 33 controlled by valve 34. Although in general any known alkylation catalyst, such as sulfuric acid, phosphoric acid, sludges comprising polyvalent metal halides such as aluminum chloride and aluminum bromide, hydrofluoric acid, boron fluoride, and mixtures of hydrofluoric acid and boron fluoride, may be used, substantially anhydrous hydrofluoric acid is preferred because of the relative ease with which it can be used and re-used and because of the superior quality of the alkylate that is produced. Known alkylation conditions are employed in alkylation means 30, such as good agitation, a temperature in the range of about 30 to 250° F., sufficient pressure to maintain the reaction mixture in the liquid phase, a high molecular excess of isoparaffin relative to the olefin, a reaction or contact time in the range of about 1 to 90 minutes, and the like. When hydrofluoric acid is the catalyst, preferred alkylation conditions comprises agitation of the quality produced by an efficient turbo-mixer, an over-all feed isoparaffin-to-olefin mol ratio in the range of about 3 to 10, a temperature in the range of about 85 to 125° F., and an average residence time in the alkylation zone of about 5 to 30 minutes. After a suitable residence time, the alkylation mixture is passed through conduit 35 controlled by valve 36 into separation means 40, in which it is separated into liquid hydrocarbon and catalyst phases, as by gravity and/or centrifugation.

The relatively light or hydrocarbon phase is passed through conduit 41 controlled by valve 42 into removal means 50, wherein it is freed from residual entrained and/or dissolved catalyst and from unreacted or unalkylated isoparaffin. When hydrofluoric acid is used as the alkylation catalyst, removal means 50 is preferably a fractional-distillation column wherefrom the residual hydrofluoric acid is distilled together with the unreacted isoparaffin and is recycled to alkylation means 30, as by conduit 51 controlled by valve 52. The acid-free kettle product from this column is passed to fractionation means 60, as though valve 53 and conduit 54, for separation into motor fuel, which is withdrawn as a product of the process through outlet 61 controlled by valve 62, and into a very small and usually negligible high-boiling oil, which is withdrawn through outlet 63 controlled by valve 64. If, however, the kettle product from removal means 50 has an objectionable content of organically combined fluorine, it is first preferably passed to purification means 70, as through conduit 65 controlled by valve 66, for removal of the organic fluorine, which seldom exceeds 0.01 per cent by weight, as by contacting with a granular material having some degree of affinity for organic fluorine, for example, metal-impregnated contact materials or, more economically, bauxite at a temperature of about 200 to 500° F.; then it is passed, as through conduit 71 controlled by valve 72 to fractionation means 60. When the catalyst is other than hydrofluoric acid, means equivalent in function to removal means 50, fractionation means 60, and/or purification means 70 can be readily supplied by those skilled in the art of alkylation of paraffins.

The relatively heavy or catalyst phase from separation means 40 is passed through conduit 73 controlled by valve 74 to regeneration means 80, wherein this phase is treated to recover the catalyst, which is recycled to alkylation means 30, as through valve 81 and conduit 51. The residue is withdrawn through outlet 82 controlled by valve 83. When the catalyst is primarily hydrofluoric acid, regeneration means 80 is suitably a fractionation column, wherefrom the hydrofluoric acid is distilled together with a relatively small proportion of unreacted isoparaffin dissolved in the catalyst phase.

As has been already stated, in this embodiment of the invention, a solid granular isomerization catalyst is preferred for the isomerization stage represented by isomerization means 10, especially when this isomerization means is a column packed at least in part with the catalyst. Among such preferred catalysts are those comprising black chromium oxide. Many modes of preparation of these black chromium oxide-containing catalysts have been shown in various publications, as for example, in U. S. Patents 1,905,383, 2,098,959, 2,270,887, 2,274,988, 2,288,320, 2,294,414, and many others, and need not be repeated in detail. All these methods, yielding catalysts comprising black chromium oxide, may be said to be characterized by the non-spontaneous thermal decomposition of one or more chromium compounds, such as: chromic salts, preferably of monobasic acids; hydrous chromium oxides and/or hydroxides; various compounds formed from chromic acid, such as chromates or polychromates of volatile nitrogen bases, preferably ammonia, and double or mixed chromates representable by the general formula $(NH_4)_2M(CrO_4)_2$, in which M is a divalent metal, such as cadmium, chromium, or copper; and the like. Catalysts prepared in other ways and comprising other chromium compounds, such as green chromic oxide or chromium sesquioxide, may also be used whenever such catalysts possess an adequate catalytic power for isomerizing 1-olefins to 2-olefins. Still other granular catalysts possessing adequate isomerizing ability may be used, such as many catalysts that contain no chromium oxide of any kind, for example, magnesia, and particularly calcined brucite, which is an especially economical magnesia olefin-isomerization catalyst.

However, in the broad concept of this invention, the isomerization catalyst need not be a solid or granular material, but it may be any material that can effect a desired extent of isomerization of 1-olefins to 2-olefins. A number of suitable catalysts are known, such as perchloric acid, phosphoric acid, benzene sulfonic acid, and zinc chloride; these and other catalysts, such as calcium oxide, silica, titania, silica-alumina, and the like, that may be useful in particular instances are mentioned, for example, in Chapter II of "Isomerization of Pure Hydrocarbons" by Egloff, Hulla and Komarewsky (1942). It should be understood that, except as may be specified in the appended claims, the invention is not to be limited to any particular isomerization catalyst. The catalyst may be one that causes a minor or incidental isomerization of normal or secondary olefins to isoolefins; isomerization of secondary olefins to isoolefins followed by hydrofluoric acid alkylation of isobutane with the resulting isoolefins to obtain motor fuel of high octane rating has been disclosed in my copending application Serial No. 467,411, filed November 30, 1942, and now abandoned.

When the use of a liquid catalyst is desired for the isomerization stage, it is usually advantageous to use aqueous hydrofluoric acid containing between 50 and 80 per cent hydrogen fluoride by weight, and preferably about 65 per cent. Aqueous sulfuric acid containing about 70 to 90 per cent sulfuric acid by weight, preferably about 80 per cent, may be used likewise, but a certain amount of loss occasioned by the oxidizing power of this acid is to be expected. These and other acid-type catalysts have the disadvantage that they promote polymerization of olefins as well as isomerization.

In the broadest concept of this invention, the isomerization catalyst may be omitted, and the isomerization of the 1-olefin may be carried out noncatalytically. However, in such case, the temperature is so high, above about 1100° F., that the isomerization equilibrium is adversely affected and the isomerization is accompanied by an excessive conversion to cracking products.

Some of the many aspects of the invention are illustrated by the following examples, but the specific details given should not be construed as being necessarily limitative of the invention.

*Example I*

In a continuous process similar to that illustrated by the drawing, butene-1 is passed at about atmospheric pressure through a bed of chromium oxide gel-type granules at about 450 to 700° F. at a space velocity of about 1000 vapor volumes per catalyst volume per hour, whereby about four-fifths of it is converted to butene-2. The resulting mixture of butylenes is condensed by cooling and compression, and is passed to an alkylator for the hydrofluoric acid alkylation of isobutane. In the alkylator, intimate mixing is obtained with a turbo-mixer; the temperature is about 110 to 120° F.; the volume ratio of hydrocarbons to hydrofluoric acid is about 1.5 to 2.0; the over-all mol ratio of isobutane to butylene is about 9; and the average residence time of the alkylation mixture is about 8 to 12 minutes. The alkylate produced under these conditions, when isolated from the acid and from the unreacted isobutane and cut to an end point of about 390° F., has an ASTM octane number of about 91.8, which is increased to about 101.6 by 1 cc. of lead tetraethyl per gallon.

Under the same conditions, but without the preliminary isomerization, the alkylate produced from isobutane and butene-1 has an octane number of only about 88.9, which is increased to about 99.8 by 1 cc. of lead tetraethyl per gallon. The isomerization of the original butene-1 to butene-2 thus cooperates with the alkylation to produce an alkylate of advantageously considerably improved octane rating.

*Example II*

The process is carried out as in Example I except that the effluent from the isomerization step is fractionally distilled to remove unconverted butene-1, which is recycled to the isomerization step. The alkylate produced with the resulting kettle product by alkylating isobutane under the conditions given in Example I has an octane number of about 92.5, which is increased to about 102.0 by 1 cc. lead tetraethyl per gallon. The octane rating is thus substantially increased by incorporation of the fractionation step into the process.

*Example III*

Butene-1 is subjected to the isomerization action of granular calcined brucite at about 200 to 280° F. The space velocity is about 1 to 5 liquid volumes per catalyst volume per hour, and the pressure is sufficient to maintain the hydrocarbon in the liquid phase. When the isomerization effluent is used directly for hydrofluoric acid alkylation of isobutane under the alkylation conditions given in Example I, the resulting aviation-range alkylate has an ASTM octane number of about 92.0; when the isomerization effluent is preliminarily fractionated to free the butene-2 from unreacted butene-1 before it is used for alkylation of isobutane under these conditions, the alkylate has an ASTM octane number of about 92.5.

*Example IV*

Two exploratory batch-type runs were made for the hydrofluoric acid alkylation of isobutane under substantially similar conditions; one was made with butene-1 and the other with butene-2. The runs were made in an 18-liter steel reactor provided with a mechanically driven stirrer. The most pertinent data may be summarized as follows:

| Olefin | Butene-1 | Butene-2 |
|---|---|---|
| Hydrocarbons/HF (vol.) | 4.08 | 4.01 |
| Isobutane/olefin (mol) | 12.4 | 15.1 |
| Temperature, °F | 99–113 | 99 |
| Reaction time, min. (avg.) | 14.5 | 25 |
| Aviation-range alkylate: | | |
| Cut point, °F | 356 | 365 |
| Yield, vol. per cent | 91.4 | 97.9 |
| Octane No. (ASTM) | 89.2 | 92.7 |

These data demonstrate that butene-2 is superior to butene-1 for the hydrofluoric acid alkylation of isobutane.

Example V

A run was made for the hydrofluoric acid alkylation of isobutane in a small continuous pilot plant comprising a turbo-mixer reactor and a separator wherefrom the acid phase was recycled to the reactor by gravity. One portion only of substantially anhydrous hydrofluoric acid was used, without replacement of consumed acid. Eight batches of product were made; the first three were obtained from butene-2 as the olefin, the next three from butene-1, the next to last with butene-2, and the last with butene-1. Because of experimental difficulties, the volume ratio of hydrocarbons to hydrofluoric acid in the reactor, as determined by examination of samples withdrawn from the reaction mixture, varied somewhat during the run. When production of a particular batch of product was concluded, the reactor was stopped, and the hydrocarbon phase in it and in the separator were removed, to avoid mixing of different batches. The data may be summarized as follows:

The most pertinent data may be summarized as follows:

| Olefin | Pentene-1 | Pentene-2 |
|---|---|---|
| Hydrocarbons/HF (vol.) | 3.82 | 3.31 |
| Isobutane/olefin (mol) | 9.85 | 10.93 |
| Temperature, °F | 97–112 | 99–110 |
| Reaction time, min. (avg.) | 14 | 14 |
| Aviation-range alkylate: | | |
| Cut point, °F | 320 | 347 |
| Yield, vol. per cent | 86.4 | 97.0 |
| Octane No. (ASTM)— | | |
| 0 cc. TEL | 83.8 | 89.2 |
| 1 cc. TEL | 93.0 | 100.4 |

These data demonstrate that pentene-2 is superior to pentene-1 for the hydrofluoric acid alkylation of isobutane.

Example VII

Two exploratory batch-type runs were made for the hydrofluoric acid alkylation of isopentane under substantially similar conditions; one was made with butene-1 and the other with butene-2. The runs were made in an 18-liter steel reactor provided with a mechanically driven stirrer. The most pertinent data may be summarized as follows:

| Olefin | Butene-1 | Butene-2 |
|---|---|---|
| Hydrocarbons/HF (vol.) | 1 | 1 |
| Isopentane/olefin (mol) | 8.31 | 7.5 |
| Temperature, °F | 66–100 | 68–102 |
| Reaction time, min. (avg.) | 25 | 25 |
| Aviation-range alkylate: | | |
| Cut point, °F | 284 | 293 |
| Yield, vol. per cent | 80.7 | 84.3 |
| Octane No. (ASTM)— | | |
| 0 cc. TEL | 74.6 | 79.2 |
| 1 cc. TEL | 87.7 | 89.3 |

These data demonstrate that butene-2 is superior to butene-1 for the hydrofluoric acid alkylation of isopentane.

Since this invention may be practiced otherwise

| Batch of product | 1 | 2 | 3 | 4 | 5 | 6 | 7 | 8 |
|---|---|---|---|---|---|---|---|---|
| Time in run, min | 0–39 | 39–82 | 82–323 | 323–551 | 551–612 | 612–642 | 642–661 | 661–674 |
| Butene (−1 or −2) | 2 | 2 | 2 | 1 | 1 | 1 | 2 | 1 |
| Temperature, °F. (Avg.) | 113 | 114 | 115 | 116 | 116 | 117 | 116 | 117 |
| Hydrocarbons/HF (Vol.) | 2.0 | 1.5 | 1.1 | 1.2 | 1.3 | 2.8 | 1.8 | 4.5 |
| Isobutane/butene (mol) | 8.97 | 8.97 | 8.97 | 9.05 | 9.05 | 9.05 | 8.97 | 9.05 |
| Contact time, min. (avg.) | 7.5 | 9.2 | 45.6 | 42.9 | 11.6 | 8.1 | 6.0 | 8.4 |
| Alkylate yield, wt. per cent of butene | 175 | 196 | 213 | 210 | 205 | 207 | 166 | 199 |
| Aviation-gasoline fraction: | | | | | | | | |
| Cut point, °F | 401 | 378 | 379 | 399 | 388 | 381 | 378 | 383 |
| Yield, vol. per cent | 98.3 | 96.3 | 98.6 | 98.5 | 98.2 | 98.7 | 98.2 | 97.4 |
| Reid vapor pressure, lb | 5.85 | 3.30 | 3.90 | 3.55 | 3.55 | 1.35 | 3.50 | 3.30 |
| Gravity, API | 70.6 | 70.0 | 70.4 | 70.0 | 69.7 | 69.2 | 69.9 | 69.5 |
| ASTM distillation, °F.: | | | | | | | | |
| FD | 105 | 130 | 115 | 126 | 134 | 146 | 130 | 128 |
| 10% | 153 | 187 | 178 | 186 | 192 | 199 | 185 | 188 |
| 50% | 216 | 218 | 218 | 220 | 220 | 222 | 218 | 221 |
| 90% | 243 | 239 | 243 | 255 | 247 | 248 | 240 | 254 |
| EP | 366 | 362 | 366 | 375 | 375 | 376 | 363 | 374 |
| Octane No. (ASTM): | | | | | | | | |
| 0 cc. TEL | 92.1 | 92.8 | 91.7 | 88.7 | 89.2 | 88.7 | 93.5 | 88.2 |
| 1 cc. TEL | 102.1 | 101.9 | 101.6 | 99.1 | 101.2 | 99.1 | 102.5 | |

These data show that under comparable alkylation conditions, butene-2 is definitely superior to butene-1 or the hydrofluoric acid alkylation of isobutane.

Example VI

Two exploratory batch-type runs were made for the hydrofluoric acid alkylation of isobutane under substantially similar conditions; one was made with pentene-1 and the other with pentene-2. The runs were made in an 18-liter steel reactor provided with a mechanically driven stirrer. The most pertinent data may be summarized as follows:

than as specifically described or illustrated, and since many variations and modifications of it will be obvious to those skilled in the art, this invention should not be restricted otherwise than as specified in the appended claims.

I claim:

1. In a process of producing motor fuel from an isoparaffin and a mixture of 1- and 2-olefins in which the 1-olefin is at least in part isomerized to 2-olefin by the action of a liquid isomerization catalyst and the isoparaffin is alkylated with the 2-olefin in the presence of concentrated hydrofluoric acid, the improvement which comprises using as the liquid isomerization catalyst aqueous hydrofluoric acid containing between 50 and 80 per cent hydrogen fluoride by weight.

2. In a process of producing motor fuel from an isoparaffin and a mixture of 1- and 2-olefins in which the 1-olefin is at least in part isomerized to 2-olefin by the action of a liquid isomerization catalyst and the isoparaffin is alkylated with the 2-olefin in the presence of concentrated hydrofluoric acid, the improvement of which comprises using as the liquid isomerization catalyst aqueous hydrofluoric acid containing 65 per cent hydrogen fluoride by weight.

3. The process of claim 1 wherein the said mixture of 1- and 2-olefins is first subjected to fractionation in a fractionation zone into fractions consisting essentially of 2-olefin and 1-olefin respectively, wherein the isomerization effluent is returned to said zone and wherein the alkylation is effected with 2-olefin derived solely from said zone.

MARYAN P. MATUSZAK.

REFERENCES CITED

The following references are of record in the file of this patent:

UNITED STATES PATENTS

| Number | Name | Date |
|---|---|---|
| 1,914,674 | Runge et al. | June 20, 1933 |
| 2,128,971 | Snow | Sept. 6, 1938 |
| 2,227,559 | Stevens et al. | Jan. 7, 1941 |
| 2,267,730 | Grosse et al. | Dec. 30, 1941 |
| 2,327,926 | Oakley et al. | Aug. 24, 1943 |
| 2,335,704 | Smith | Nov. 30, 1943 |